United States Patent
Breon et al.

(10) Patent No.: US 10,557,045 B2
(45) Date of Patent: Feb. 11, 2020

(54) PIGMENT DISPERSANT WITH HINDERED LIGHT AMINE STABILIZER AND PIGMENT DISPERSIONS AND COATING COMPOSITIONS BASED THEREON

(71) Applicant: PPG Industries Ohio, Inc., Cleveland, OH (US)

(72) Inventors: Jonathan P. Breon, Pittsburgh, PA (US); Steven Bowles, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 76 days.

(21) Appl. No.: 15/675,347

(22) Filed: Aug. 11, 2017

(65) Prior Publication Data

US 2019/0048212 A1  Feb. 14, 2019

(51) Int. Cl.
| | |
|---|---|
| *C09D 7/00* | (2018.01) |
| *C09D 167/04* | (2006.01) |
| *C09D 133/14* | (2006.01) |
| *C08K 5/3415* | (2006.01) |
| *C09D 7/41* | (2018.01) |

(52) U.S. Cl.
CPC .............. *C09D 7/41* (2018.01); *C09D 133/14* (2013.01); *C09D 167/04* (2013.01); *C08K 5/3415* (2013.01)

(58) Field of Classification Search
CPC ...... C09D 7/00; C09D 133/14; C09D 167/04; C08K 5/3415

USPC .......................................................... 524/513
See application file for complete search history.

(56) References Cited

U.S. PATENT DOCUMENTS

| | | | |
|---|---|---|---|
| 4,304,701 | A | 12/1981 | Das et al. |
| 5,098,974 | A | 3/1992 | Kania et al. |
| 5,990,209 | A | 11/1999 | Rubino et al. |
| 8,129,466 | B2 | 3/2012 | Polk et al. |
| 8,349,943 | B2 | 1/2013 | Ishikawa et al. |
| 8,962,718 | B2 | 2/2015 | Lacroix et al. |
| 9,056,988 | B2 | 6/2015 | Decker et al. |
| 9,403,986 | B2 | 8/2016 | Ma |
| 2006/0247338 | A1 | 11/2006 | Klei et al. |
| 2018/0086917 | A1* | 3/2018 | Wallace ................ C09B 67/009 |

FOREIGN PATENT DOCUMENTS

| | | | |
|---|---|---|---|
| JP | 2013-214000 | * | 10/2013 |
| WO | 2006118832 A2 | | 11/2006 |

* cited by examiner

*Primary Examiner* — Deve V Hall
(74) *Attorney, Agent, or Firm* — Julie W. Meder

(57) ABSTRACT

A pigment dispersion is disclosed comprising (a) at least one pigment and (b) a polymeric dispersant comprising residual units derived from polymerization of a mixture of monomers comprising (b1) at least one ethylenically unsaturated hindered amine light stabilizing monomer and (b2) at least one additional ethylenically unsaturated monomer different from monomer (b1). Coating compositions comprising the same are also disclosed as are substrates coated at least in part with such coatings.

19 Claims, No Drawings

PIGMENT DISPERSANT WITH HINDERED LIGHT AMINE STABILIZER AND PIGMENT DISPERSIONS AND COATING COMPOSITIONS BASED THEREON

FIELD OF THE INVENTION

The present invention relates to pigment dispersants produced from hindered amine light stabilizers as well as pigment dispersions and coating compositions containing the same.

BACKGROUND OF THE INVENTION

Pigmented coating compositions are used in a wide variety of applications including, for example, corrosion resistant primers and decorative topcoats in the automotive, aerospace, industrial, and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an organic carrier medium or water. The paint composition may further include reflective pigments such as aluminum flake or mica or other color effect pigment compositions or substrate-hiding materials such as titanium dioxide or zinc oxide or lead oxide.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process, the pigment agglomerates are broken down into smaller agglomerates and/or individual particles, the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

SUMMARY OF THE INVENTION

The present invention relates to a pigment dispersion comprising (a) at least one pigment and (b) a polymeric dispersant comprising residual units derived from polymerization of a mixture of monomers comprising (b1) at least one ethylenically unsaturated hindered amine light stabilizing monomer and (b2) at least one ethylenically unsaturated monomer different from monomer (b1). Monomer component (b2) typically includes an ethylenically unsaturated monomer having affinity for the pigment. The present invention furthermore relates to a curable coating composition comprising such pigment dispersion of the present invention and a resinous binder. Also included in the present invention is a method for coating a substrate comprising: applying such a curable coating composition according to the present invention onto at least a portion of the substrate and curing the coating composition to form a coating on the substrate. A substrate at least partially coated with a curable coating composition of the present invention or a cured coating derived therefrom, e.g. by the afore-mentioned coating method is also within the scope of the present invention.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" ethylenically unsaturated monomer, "an" ethylenically unsaturated hindered amine light stabilizing monomer and the like refer to one or more of any of these items.

As indicated, the present invention relates to a polymeric dispersant and a pigment dispersion comprising the same. The polymeric dispersant comprises residual structural units derived from polymerization of a mixture of monomers comprising at least one ethylenically unsaturated hindered amine light stabilizing monomer; and at least one other ethylenically unsaturated monomer, preferably including a monomer having affinity for the pigment.

Further, the terms "polymer", "polymeric" or the like refer to oligomers, copolymers (e.g., prepared from at least two monomer species), polymers prepared with more than two, such as three or more, monomer species, and graft polymers. The term "resin" is used interchangeably with "polymer."

In addition, the phrase "hindered amine light stabilizing" or the term "HALS" or the like refer to monomers or compounds that stabilize against light-induced degradation of a material (e.g. a polymer) into which they are incorporated via free radical scavenging. Such HALS monomers typically contain an amine functional group that is sterically protected.

As used herein, "(meth)acrylate" and like terms refers both to the acrylate and the corresponding methacrylate, and the term "alkoxy" refers to an —O-alkyl group. The term "alkyl" as used herein refers to a linear, branched, and/or cyclic monovalent hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical.

Alkyl groups of the various compounds of the present invention can include one or more unsaturated linkages, such as alkenyl groups and/or alkynl groups, provided the alkyl group is free of two or more conjugated unsaturated linkages. Alternatively, the alkyl groups are free of any unsaturated linkages, such as alkenyl groups and alkynl groups.

Further, the term "alkylene" refers to a linear, branched, and/or cyclic divalent hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical. Alkylene groups of the various compounds of the present invention can include one or more unsaturated linkages selected from alkenylene groups and/or one or more alkynylene groups, provided the alkylene group is free of two or more conjugated unsaturated linkages. Alternatively, the alkylene groups are free of any unsaturated linkages, such as alkenylene groups and alkynylene groups.

As used herein, recitations of "linear, branched, or cyclic" groups, such as linear, branched, or cyclic alkyl or alkylene, are herein understood to include: a divalent methylene group or a monovalent methyl group; groups that are linear, such as linear $C_2$-$C_{30}$ alkyl or alkylene groups; groups that are appropriately branched, such as branched $C_3$-$C_{30}$ alkyl or alkylene groups; and groups that are cyclic, such as cyclic $C_3$-$C_{19}$ alkyl or alkylene groups. The cyclic groups also encompass bridged ring polycycloalkyl groups (or bridged ring polycyclic groups) and fused ring polycycloalkyl groups (or fused ring polycyclic groups).

The alkyl and alkylene groups, as well as any of the other groups described herein, also include substituted groups thereof. As used herein, "substituted" and "substituted group" means a group, such as an alkyl group or alkylene group for example, in which at least one hydrogen thereof has been optionally replaced or substituted with a heteroatom (other than carbon or hydrogen), such as, but not limited to, halo groups (e.g., F, Cl, I, and Br), hydroxyl groups, ether groups, thiol groups, thioether groups, carboxylic acid groups, carboxylic acid ester groups, phosphoric acid groups, phosphoric acid ester groups, sulfonic acid groups, sulfonic acid ester groups, nitro groups, cyano groups, and amine groups.

In addition, as used herein, "ethylenically unsaturated" refers to a group having at least one carbon-carbon double bond.

The dispersant of the present invention comprises a polymer having residual units derived from polymerization of a mixture of monomers comprising (1) at least one ethylenically unsaturated hindered amine light stabilizing monomer and (2) at least one other ethylenically unsaturated monomer. By "other" or "additional" ethylenically unsaturated monomer is meant an ethylenically unsaturated monomer, which is not an ethylenically unsaturated hindered amine light stabilizing monomer. Typically the at least one other ethylenically unsaturated monomer comprises one or more ethylenically unsaturated monomer having affinity for a pigment, where the pigment may be organic or inorganic. By "having affinity for" a pigment, it is meant that the monomer (or polymer containing a residue thereof) has a stronger affinity for particles of the pigment than the mutual affinity of the pigment particles such that agglomeration of the pigment particles is minimized or avoided.

Suitable ethylenically unsaturated HALS monomers that can be used for preparing the polymeric dispersant according to the present invention are not particularly limited and include any ethylenically unsaturated HALS monomers known from the prior art such as substituted ethylenically unsaturated piperidyl derivatives. The at least one ethylenically unsaturated HALS monomer used to form the polymeric dispersant according to the present invention may for example be based on piperidines such as represented by Formula I:

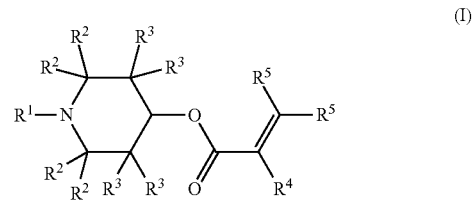

where $R_1$ may be selected from hydrogen, a $C_1$-$C_6$ alkyl group, a $C_1$-$C_6$ alkoxy group, and a $C_1$-$C_6$ acyl group, each $R_2$ may be independently selected from hydrogen and a $C_1$-$C_6$ alkyl group, each $R_3$ and $R_4$ may be independently selected from hydrogen and a methyl group, and each $R_5$ is independently selected from hydrogen and a $C_1$-$C_6$ alkyl group. For example, the ethylenically unsaturated HALS monomer may be 1,2,2,6,6-pentamethyl piperdyl (meth)acrylate or 2,2,6,6-tetramethyl piperdyl (meth)acrylate.

The ethylenically unsaturated HALS monomer(s) used to prepare the polymeric dispersant can comprise at least 2 weight %, at least 5 weight %, or at least 10 weight % based on the total weight of the mixture of monomers. The ethylenically unsaturated HALS monomer(s) used to prepare the polymeric dispersant can comprise up to 50 weight %, up to 25 weight %, or up to 15 weight % based on the total weight of the mixture of monomers.

As set forth above at least one other ethylenically unsaturated monomer is used in addition to the HALS monomer in the preparation of the polymeric dispersant of the present invention. Typically the at least one other ethylenically unsaturated monomer comprises an ethylenically unsaturated monomer having affinity for the pigment. The ethylenically unsaturated monomer having affinity for the pigment may comprise at least one functional group with affinity for the pigment selected from an amine group, an ammonium group, an aromatic group (including a phenolic group), a carboxylic acid group, a sulfonate group, a phosphonate group, a nitro group, a hydroxyl group or a combination thereof.

When the pigment comprises an organic pigment, the pigment affinic ethylenically unsaturated monomer may comprise for example at least one functional group having affinity with the organic pigment such as an amine group, an ammonium group, an aromatic group, including a phenolic group or a combination thereof.

Suitable ethylenically unsaturated amines include for example vinyl amine, N-methyl N-allyl amine, $C_1$-$C_{24}$ alkyl allyl amine, ethoxylated and/or propoxylated $C_1$-$C_{24}$ alkyl allyl amine, $C_1$-$C_{24}$ dialkyl allyl amine, ethoxylated and/or propoxylated alkyl amine diallyl amine, $C_1$-$C_{24}$ alkyl diallyl amine, ethoxylated and/or propoxylated diallyl amine, triallyl amine, 1,2-diaminoethene, aminocrotonitrile, diaminomaleonitrile, N-allylcyclopentylamine, N-allylaniline, allylcyclohexylamine, [1-(2-allylphenoxy)-3-(isopropylamino)-2-propanol], 3-amino-2-butenethioamide, bis[4-(dimethylamino)benzylidene]acetone, 1,4-butanediol bis(3-aminocrotonate), 3-amino-1-propanol vinyl ether, 2-(diethylamino)ethanol vinyl ether, 4-(diethylamino)cinnamaldehyde, 4-(diethylamino)cinnamonitrile, 2-(diethylamino)ethyl methacrylate, diethyl (6-methyl-2-pyridylaminomethylene)maleate, 3-(dimethylamino)acrolein, 2-(dimethylamino)ethyl methacrylate, 4-dimethylaminocinnamaldehyde, 2-(dimethylamino)ethyl acrylate, 3-(dimethylamino)-2-methyl-2-propenal, 9-vinylcarbazole, N-vinylcaprolactam, 1-vinylimidazole, 2-vinylpyridine, 4-vinylpyridine, allylcyclohexylamine, N-allylcyclopentylamine, allyl(diisopropylamino)dimethylsilane, 1-allylimidazole, 1-vinyl-2-pyrrolidinone, N-[3-(dimethylamino)propyl]methacrylamide, 4-[4-(dimethylamino)styryl]pyridine, 2-[4-(dimethylamino)styryl]pyridine, 2-[4-(1,2-diphenyl-1-butenyl)phenoxy]-N,N-dimethylethylamine, 2-[4-dimethylamino)styryl]-benzothiozole, 5-[4-(dimethylamino)phenyl]-2,4-pentandienal, (dimethylamino-methylene)malononitrile, 4-dimethylaminocinnamonitrile, 4-(dimethylamino)chalcone, [6-(3,3-dimethylallylamino-purine riboside, 3,7-dimethyl-2,6-octadien-1-ylamine, 2-isopropenylaniline, isopropyl 3-aminocrotonate, S-{2-[3-(hexyloxy)benzoyl]-vinyl}glutathione, methyl 3-aminocrotonate, N-methylallylamine, N-methyl-1-(methylthio)-2-nitroethenamine, oleylamine, tetrakis(dimethylamino)ethylene, 5-[(6,7,8-trimethoxy-4-quinazolinyl)amino]-1-pentanol nitrate ester, tris(2-methylallyl)amine, N,N,N',N'-tetramethyl-2-butene-1,4-diamine, S-{2-[3-(octyloxy)benzoyl]vinyl}-glutathione, 4,4'-vinylidene-(N,N-dimethylaniline), 2',5'-dimethoxy-4-stilbenamine, 3-(dimethylamino)propyl acrylate, 3-dimethylaminoacrylonitrile, 4-(dimethylamino)-cinnamic acid, 2-amino-1-propene-1,1,3-tricarbonitrile, 2-amino-4-pentenoic acid, N,N'-diethyl-2-butene-1,4-diamine, 10,11-dihydro-N,N-dimethyl-5-methylene-5H-dibenzo[a,d]-cyclohepene-10-ethan amine maleate, 4-(dicyanomethylene)-2-methyl-6-(4-dimethyl-aminostyryl)-4H-pyran, N-ethyl-2-methylallylamine, ethyl 3-aminocrotonate, ethyl-α-cyano-3-indoleacrylate, ethyl-3-amino-4,4-dicyano-3-butenoate, 1,3-divinyl-1,1,3,3-tetramethyldisilazane, N-(4,5-dihydro-5-oxo-1-phenyl-1H-pyrazol-3-yl)-9-octadecen-amide, and N-oleoyl-tryptophan ethyl ester, and mixtures thereof.

Nonlimiting examples of suitable ethylenically unsaturated ammonium compounds include quaternary ammonium salts of Formula II:

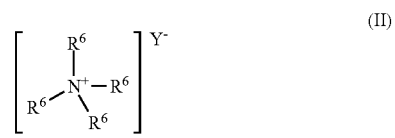

wherein each $R_6$ may be independently selected from substituted or unsubstituted $C_1$-$C_{30}$ hydrocarbyl groups and may contain one or more aromatic, ether, ester, amido, or amino moieties present as substituents or as linkages in the radical chain, wherein at least one of the $R_6$ groups contains at least one or more ethylene groups; and wherein $Y^-$ is an anion group selected from the group consisting of sulfonate, sulfate, sulfinate, sulfenate, phosphate, carboxylate, nitrate, and acetate. Additionally, useful ethylenically unsaturated ammonium compounds include those of Formula II in the form of ring structures formed by covalently linking two of the $R_4$ groups. Examples include unsaturated imidazolines, imidazoliniums, and pyridiniums, and the like. These quaternary ammonium salts may be prepared by a variety of methods known to the art, for example, halide exchange, wherein a halide based quaternary ammonium compound is ion exchanged with Y, as defined above.

Nonlimiting examples of ethylenically unsaturated aromatic monomers include non-phenolic aromatic styrene monomers, such as α-methylstyrene, isopropylstyrene, ethoxy styrene, p-methyl-α-methylstyrene, vinyl toluene, vinyl naphthalene, divinylbenzene, ethyl vinyl benzene, and the like.

Phenolic monomers that may be used as organic pigment affinic compounds include cardanol, cardol, 2-methylcardol, urishiol, thitsiol, ranghol, laccol, 1-hydroxy-2-carboxy-3-pentanylbenzene, 1-hydroxy-2-carboxy-3-(8',11',1'-pentadicadiyl)benzene, anacardic acid and the like. The pigment affinic ethylenically unsaturated monomer can comprise at least 40 weight %, at least 30 weight % or at least 15 weight % based on the total weight of the reactants.

When the pigment comprises an inorganic pigment, the pigment affinic ethylenically unsaturated monomer comprises at least one functional group having affinity for the inorganic pigment selected, for example, from a carboxylic acid group or salt thereof, a sulfonate group, a phosphonate group, an ammonium group, a nitro group, a hydroxyl group or a combination thereof. Examples include (meth)acrylic acid, 2-(dimethylamino)ethyl acrylate, 3-sulfopropyl acrylate, hydroxyethyl acrylate, acrylamide, acrylonitrile, and phosphate esters of polyethylene glycol monomethacrylate, such as SIPOMER® PAM-100, available from Rhodia Group, Princeton, N.J.

The at least one ethylenically unsaturated monomer other than the HALS monomer may comprise, in addition to the at least one pigment affinic monomer, at least one further ethylenically unsaturated monomer. Such optional further ethylenically unsaturated monomer accordingly has no affinity to the pigment in the above-mentioned sense and is different from the hindered amine light stabilizing monomer and the pigment affinic monomer. The at least one further ethylenically unsaturated monomer (other than the HALS monomer and pigment affinic monomer) used in preparing the polymeric dispersant according to the present invention may for example comprise a hydroxyl functional ethylenically unsaturated monomer, for example as an ethylenically unsaturated monomer having affinity for the pigment or as a further ethylenically unsaturated monomer. Such hydroxyl functional ethylenically unsaturated monomers can be exemplified, without being limited thereto, by hydroxyalkyl (meth)acrylates, such as 2-hydroxyethyl (meth)acrylate, 2-hydroxypropyl (meth)acrylate, 3-hydroxypropyl (meth)acrylate, 4-hydroxybutyl (meth)acrylate, and mixtures thereof. The further ethylenically unsaturated monomer(s), if used, can comprise at least 80 weight %, at least 50 weight %, or at least 20 weight % based on the total weight of the reactants.

The polymeric dispersant of the present invention may optionally further comprise one or more ester linkage, ether linkage or a combination thereof in the polymer. Such linkages (also termed residues) can for example be introduced by reacting the product of the polymerization of the monomer mixture that includes the HALS monomer with a polymer extending or building component such as a component that produces a residue of an ester and/or ether therein. Alternatively such polymer extending or building component could also be included in the monomer mixture enabling formation of the ester and/or ether linkages also during polymerization of the ethylenically unsaturated monomers. For example, ester linkages can be formed in the polymer by reacting a lactone with a hydroxy-functional component of the monomer mixture, such as a hydroxy-functional ethylenically unsaturated monomer or a residual structural unit derived therefrom present in the polymer. A lactone reacts in a ring-opening polymerization reaction with the hydroxyl functional component. As used herein, lactones include delta, epsilon and gamma lactones (i.e., including 5, 6 and 7 membered rings), with one or more carbonyl groups and one or more ring oxygens. Specific examples include caprolactone, valerolactone, glycolide and lactide, as well as substituted versions thereof.

Likewise, ether linkages can be formed in the polymer by reacting a cyclic ether with a hydroxy-functional component of the monomer mixture, such as the hydroxyl functional ethylenically unsaturated monomer or a residual structural unit derived therefrom present in the polymer. Suitable cyclic ethers include for example ethylene oxide, propylene oxide, butene-1-oxide, isobutene oxide, 3,3-bischloromethyloxetane, tetrahydrofuran, 2- or 3-methyl-tetrahydrofuran, dioxane, trioxane, tetraoxane, cyclohexene oxide, styrene oxide, epichlorhydrin, glycidyl methacrylate, acryl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Such polymer extending or building components can comprise at least 40 weight %, at least 20 weight %, or at least 10 weight % based on the total weight of the reactants used to form the polymeric dispersant.

The mixture of reactants can be combined in a non-aqueous or aqueous liquid medium to prepare a pigment dispersant as described above. The non-aqueous or aqueous liquid medium can comprise any of the solvents described hereinafter. The pigment dispersion may be aqueous or non-aqueous.

As used herein, the term "non-aqueous" refers to a liquid medium comprising less than 50 weight % water, based on the total weight of the liquid medium and an aqueous medium comprises at least 50 weight % water. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include glycols, glycol ether alcohols, alcohols, ketones, glycol diethers, esters, and diesters. Other non-limiting examples of organic solvents include aromatic and aliphatic hydrocarbons.

Any suitable free radical polymerization initiator may be used to polymerize the ethylenically unsaturated monomers such as peroxide compounds, azo compounds and persulfate compounds. The amount of initiator may be 0.01 to 0.5 mole initiator per mole of ethylenically unsaturated monomers. The resulting polymer may be used as a pigment dispersant or may be further reacted by incorporating therein ester and/or ether linkages using a catalyst such as a tin catalyst for polymerization of the polymer with lactone or cyclic ethers as described above to produce a polyester or polyether functional polymeric dispersant.

As indicated, the various combination of reactants described herein can be reacted together in a non-aqueous liquid medium to form the polymeric dispersant of the present invention. The process for forming the polymeric dispersant can be chosen to produce a particular polymer architecture. For example, the mixture of reactants can be reacted to form a linear random copolymer architecture or a linear block copolymer architecture. Other non-limiting examples of polymer architectures that can be formed include branched type architectures such as comb, brush, and hyperbranched architectures.

As used herein, a "random copolymer" refers to a polymer with residual units derived from multiple types of monomers arranged in an irregular, random order. A "block copolymer" refers to a polymer with multiple sequences, or blocks, of residual units derived from the same monomer alternating in series with different monomer blocks. The block copolymer can be a diblock copolymer (copolymer with two blocks), a triblock copolymer (copolymer with three blocks), a multi-block copolymer (copolymer with four or more blocks), and combinations thereof.

The term "comb polymer" refers to a polymer comprising a main chain (or backbone) with multiple branch points from which a side chain emanates such that the polymer resembles a comb-like shape in the planar projection. Comb polymers typically have two or more branch points with a functionality of three, as is described in "Lattice models of branched polymers: combs and brushes", Lipson et al., *Macromolecules,* 1987, 20(1), at pages 186-190. A "branch point" refers to a point on a polymer main chain at which a branch is attached. A "branch," also referred to as a "side chain" or "pendant chain or group," is an offshoot from the polymer main chain.

The term "brush polymer" refers to a polymer comprising a main chain (or backbone) with multiple branch points from which a side chain emanates such that the polymer resembles a brush-like shape in the planar projection. Brush polymers typically have at least one branch pointed with a functionality of greater than three, as is described in "Lattice models of branched polymers: combs and brushes", Lipson et al., *Macromolecules,* 1987, 20(1), at pages 186-190. Further, a "hyperbranched polymer" refers to a polymer that is a highly branched macromolecule with a three-dimensional dendritic architecture as defined in Prog. Polym. Sci. 29 (2004), pgs. 183-275, Gao et al.

The different polymer architectures previously described can also be used to dictate the properties of the polymeric dispersant. For example, the different polymer architectures can be used to form pendant groups in a particular order and at particular segments on the polymeric dispersant. The different polymer architectures can also be used to form additional pendant chains on the lipophilic/hydrophilic polymer. For instance, a comb, brush, or hyperbranched polymeric dispersant polymer can have pendant macromonomers extending from the main chain or backbone.

As used herein, a "macromonomer" refers to a large molecule, such as a polymer for example, containing at least one active polymerization site, such as an ethylenically unsaturated group, or a binding site. The macromonomer can be prepared under conditions such as described in the examples or by other methods known in the art. Macromonomers generally have a high molecular weight as compared to monomers. Various methods known in the art can be used to incorporate the macromonomers onto the polymeric dispersant including, but not limited to, various grafting techniques, including "grafting through" in which the macromonomer is co-polymerized with the monomers that form the polymer main chain or backbone, or "grafting on" or "grafting to" of a macromonomer chain onto a main chain or backbone that is already formed. The macromonomer can be pre-prepared by reacting any combination of monomers previously described.

It should be understood that such further polymerization may form graft copolymers. By "graft copolymer" it is meant to include the structure of a macromonomer grafted onto a polymer backbone. Upon polymerization of the macromonomer with other ethylenically unsaturated monomers, the ethylenically unsaturated portion of the macromonomer becomes a part of the backbone of the graft polymer, and the remainder of the macromonomer forms the side chain of the graft copolymer.

The pigment dispersant of the present invention can comprise a graft copolymer having a polymeric backbone and side chains attached to the backbone at a single terminal point. As used here, all percentages by weight are based on the total weight of the graft copolymer.

For example, a monomer containing a hydroxyl functional group such as any of the hydroxyl functional ethylenically unsaturated monomers described above can be used to form the graft copolymer wherein the hydroxyl functional monomers are polymerized as part of the monomer mixture and form a part of the backbone.

The pigment dispersant may be present in the pigment dispersion of the present invention in an amount of at least 0.1 weight % or at least 0.5 weight % or at least 1 weight % based on the total weight of the pigment dispersion. The pigment dispersant may be present in the pigment dispersion in an amount of less than 65 weight % or less than 40 weight % based on the total weight of the pigment dispersion. The amount of pigment dispersant present in the pigment dispersion of the present invention may range between any combination of these values, inclusive of the recited values.

The pigment dispersion of the present invention comprises a pigment component comprising at least one pigment. The one or more pigment(s) used in the pigment dispersion can be selected from organic pigments, inorganic pigments or a mixture or combination thereof. The pigment dispersion of the present invention may for example comprise an inorganic pigment, such as carbon black pigments, e.g., furnace blacks, electrically conductive carbon black pigments, titanium dioxide, electrically conductive titanium dioxide, and iron oxides, e.g., red iron oxide, yellow iron oxide, black iron oxide, and transparent iron oxides and mixtures thereof.

The pigment dispersion of the present invention may alternatively or additionally comprise an organic pigment, such as perylene, phthalo green, phthalo blue, nitroso pigment, monoazo pigment, diazo pigment, diazo condensation pigment, basic dye pigment, alkali blue pigment, blue lake pigment, phloxin pigment, quinacridone pigment, lake pigment of acid yellow 1 and 3, carbazole dioxazine violet pigment, alizarine lake pigment, vat pigment, phthaloxy amine pigment, carmine lake pigment, tetrachloroisoindolinone pigment and mixtures thereof.

The pigment component is typically present in the pigment dispersion of the present invention in an amount of at least 0.5 weight %, or at least 5 weight %, and/or at least 10 weight %, based on the total weight of the pigment dispersion. The pigment is also typically present in the pigment dispersion in an amount of less than 90 weight % or less than 20 weight % based on the total weight of the pigment dispersion. The amount of pigment present in the pigment dispersion may range between any combination of these values, inclusive of the recited values.

The pigment and pigment dispersant are typically together present in the pigment dispersion in an amount totaling from 20 to 80 weight %, e.g., 30 to 70 weight %, or 40 to 60 weight % based on the total weight of the pigment dispersion. The percent weights are based on the total combined weight of the pigment and pigment dispersant. The weight ratio of pigment to pigment dispersant is typically from 0.1:1 to 100:1, e.g., from 0.2:1 to 5:1 or from 0.5:1 to 2:1.

Extender particles that may be present in the pigment dispersion include, but are not limited to, silicas, clays, and alkaline earth metal sulfates, such as calcium sulfate and barium sulfate. The pigment dispersion may contain corrosion inhibitors, such as aluminum phosphate and calcium modified silica.

The pigment dispersion of the present invention is useful in the preparation of, for example, coating compositions and inks. To form a pigmented coating composition, the pigment dispersion is typically mixed together with a resinous binder component, and optionally one or more crosslinkers, additives and/or additional solvents. Coating compositions into which the pigment dispersion of the present invention may be incorporated include, for example, liquid spray-, dip-, and curtain-applied primer, basecoat (i.e., the basecoat in a color-plus-clear basecoat/clearcoat system) and topcoat compositions, and electrodepositable coating compositions. Such coating compositions into which the pigment dispersion of the present invention may be incorporated may be applied directly to a substrate, e.g. as a monocoat, or used in one or more coating layers in a multi-layered coating system, e.g. as a pigmented layer that is coated with a clearcoat or other topcoat. As set forth above, the present invention relates thus also to curable coating compositions comprising the pigment dispersion described beforehand and a resinous binder.

In such a coating composition of the present invention, the resinous binder can be selected from, for example, polyurethanes, acrylic polymers, polyester polymers, polyamide polymers, polyether polymers, polysiloxane polymers, epoxy resins, vinyl resins, copolymers thereof, and mixtures thereof. Thermosetting or curable coating compositions typically comprise a resin having functional groups. The resinous binder can thus have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), N-hydroxymethylene and N-alkoxymethylene groups (such as found in melamine/formaldehyde resins), and combinations thereof. For example the resinous binder may comprise at least one functional group selected from an ether group, ester group, hydroxyl group, acid group, amine group, amide group, carbamate group, urea group, aromatic functional group or a combination thereof. Appropriate mixtures of resins may also be used in the preparation of the present coating compositions.

The coating compositions of the present invention typically further comprise a crosslinker known in the art to react with a functionality used in the coating compositions. As used herein, the term "crosslinker" refers to a molecule comprising two or more functional groups that are reactive with other functional groups, the molecule being capable of linking two or more monomers or polymer molecules through chemical bonds. Thermosetting compositions of the present invention can also include a resinous binder having functional groups that are reactive with themselves; in this manner, such resinous binders of the thermosetting compositions are self-crosslinking. The crosslinkers optionally used in the coating compositions according to the present invention may be reactive with the resinous binder and/or the polymeric dispersant may, for example, be reactive with functional groups (e.g. hydroxyl groups) present on both the polymeric dispersant and the resin (e.g. polyols) such that upon curing, crosslinking between polymeric dispersant and resin occurs. Suitable non-limiting examples of crosslinkers include aminoplast or isocyanate crosslinkers. When present, the crosslinker can be comprised in the coating compositions of the present invention in amounts of at least 1 weight %, at least 5 weight %, or at least 10 weight % based on the total solids weight of the coating composition. The crosslinker can be comprised in the coating composition of the present invention in amounts of up to 50 weight %, up to 70 weight %, or up to 90 weight % based on the total solids weight of the coating composition. The crosslinker can be comprised in the coating composition of the present invention in a range between any of the aforementioned limit values, such as 1 to 90 weight %, 5 to 70 weight %, or 10 to 50 weight % based on the total solids weight of the coating composition.

The resinous binder can be comprised in the coating composition of the present invention in an amount of at least 1 weight %, at least 5 weight %, or at least 10 weight %, based on the total solids weight of the coating composition. The resinous binder can be comprised in the coating composition of the present invention in an amount of up to 99 weight %, up to 95 weight %, or up to 90 weight % based on the total solids weight of the coating composition. The resinous binder can be comprised in the coating composition of the present invention in amounts in a range between any of the afore-mentioned limit values, such as from 1 to 99 weight %, from 5 to 95 weight % or from 10 to 90 weight % based on the total solids weight of the coating composition. The pigment dispersion can be comprised in the coating composition of the present invention in amounts of at least 1 weight %, at least 5 weight %, or at least 10 weight % based on the total solids weight of the coating composition. The pigment dispersion can be comprised in the coating composition of the present invention in amounts of up to 90 weight %, up to 70 weight %, or up to 50 weight % based on the total solids weight of the coating composition. The pigment dispersion can be comprised in the coating composition of the present invention in a range between any of the aforementioned limit values, such as 1 to 90 weight %, 5 to 70 weight %, or 10 to 50 weight % based on the total solids weight of the coating composition.

The coating composition including the pigment dispersion of the present invention may further comprise a solvent. The solvent may comprise an organic solvent such as any one of the non-limiting exemplary organic solvents mentioned above, in particular when the pigment component comprises an organic pigment. Alternatively, the solvent may comprise an aqueous medium, in particular when the pigment component comprises an organic pigment. Suitable solvents include water miscible glycols, glycol esters, glycol ethers, alcohols, and/or ketones.

Other non-limiting examples of materials that can be used with the coating compositions of the present invention include plasticizers, abrasion resistant particles, corrosion resistant particles, corrosion inhibiting additives, fillers (including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts and reaction inhibitors) and other customary auxiliaries.

The curable coating compositions according to the present invention can be provided in different forms. For example the coating composition may be a powder coating composition or may be formulated as a liquid coating composition.

The coating compositions of the present invention can be applied to a wide range of substrates known in the coatings industry. For example, the coating composition of the present invention can be applied to automotive substrates, industrial substrates, packaging substrates, wood flooring and furniture, apparel, electronics (including housings and circuit boards), glass and transparencies, sports equipment (including golf balls), and the like. These substrates can be, for example, metallic or non-metallic. Non-metallic substrates include polymeric substrates such as polyester, polyolefin (e.g. polypropylene, polyethylene), polyamide, cellulose, polystyrene, polyacrylic, poly(ethylene naphthalate) or poly(ethylene terephthalate) (PET), nylon, ethylene vinyl alcohol (EVOH), polylactic acid, other "green" polymeric substrates, polycarbonate, polycarbonate acrylonitrile butadiene styrene (PC/ABS), polyamide, wood, veneer, wood composite, particle board, medium density fiberboard, cement, stone, sapphire, glass, paper, cardboard, textiles, leather, both synthetic and natural, and the like. Non-limiting examples of glass substrates include conventional untinted soda-lime-silica glass, i.e., "clear glass", or tinted or otherwise colored glass, borosilicate glass, GORILLA® glass, leaded glass, and tempered, untempered, annealed, or heat-strengthened glass. The glass may be of any type, such as conventional float glass or flat glass, and may be of any composition having any optical properties, e.g., any value of visible radiation transmission, ultraviolet radiation transmission, infrared radiation transmission, and/or total solar energy transmission. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. The curable coating composition of the present invention is typically applied onto at least a portion of a substrate such as any one of the previously mentioned substrates and then cured to form a coating on the substrate. The present invention thus relates also to substrates at least partially coated with a coating composition of the present invention or a coating derived therefrom. Substrates with a coating derived from the coating compositions of the present invention can exhibit favorable physical properties, such as an enhanced gloss retention and/or color stability, weathering resistance and UV durability. For example, a cured coating obtained from the curable coating compositions of the present invention may exhibit an ultraviolet durability at least as high as a coating prepared from a corresponding coating composition, but without the characteristic polymeric pigment dispersant according to the present invention.

EXAMPLES

The following examples are presented to demonstrate the general principles of the invention. The invention should not be considered as limited to the specific examples presented. All parts and percentages in the examples are by weight unless otherwise indicated.

Examples 1-3: Preparation of Polymeric Dispersants

Polymers were prepared as described below for use as dispersant in the liquid pigment dispersions of Examples 5-7. Weight average molecular weight (Mw) in grams per mole was determined by gel permeation chromatography versus a polystyrene standard. The weight average molecular weight is determined with gel permeation chromatography relative to linear polystyrene standards of 800 to 900,000 Da with tetrahydrofuran as the eluent at a flow rate of 1 ml/min using a Waters 2695 separation module with a Waters 410 differential refractometer (RI detector) and two PL gel Mixed-C (300×7.5 mm) columns for separation. The amount of residual monomer was determined by gas chromatography. Completion of the reaction was assessed by determining the residual monomer content in mole percent (mol. %) in the reaction mixture via gas chromatography, using an Agilent 6890 Gas Chromatography system with dual injection and flame ionization detectors (FIDs) The analytes were eluted from the columns with hydrogen carrier gas at 3 ml/min and separated using a DB-5 (30 m×0.25 µm×1.0 µm) and FFAP (50 m×0.25 µm×0.25 um) columns. The mol. % is the percent of an initial monomer present at the conclusion of the reaction of total monomer present at the beginning of the reaction.

Example 1

A hydroxyl functional resin composition was prepared from the following components listed in Table 1.

TABLE 1

| Component | Wt. in grams |
|---|---|
| A | |
| Butyl acetate | 100.56 |
| B | |
| N-methyl HALS methacrylate[1] | 80.14 |
| Isobutyl methacrylate (iBMA) | 200.91 |
| N,N-Dimethylaminoethyl methacrylate (DMAEMA) | 40.13 |
| Hydroxyethyl acrylate (HEA) | 80.06 |
| tert-Dodecyl mercaptan | 4.02 |
| Triphenyl phosphite | 2.02 |
| C | |
| Butyl acetate | 60.05 |
| VAZO ™ 67[2] catalyst | 28.04 |
| D | |
| Butyl acetate | 12.17 |
| E | |
| Butyl acetate | 60.2 |
| VAZO ™ 67[2] | 4.01 |

[1]1,2,2,6,6-pentamethyl-4-piperidyl methacrylate (CAS# 68548-08-3)
[2]2,2'-azobis(2-methylbutyronitrile) (CAS# 13472-08-7) available from Sigma-Aldrich Charge A was placed into a 4-neck round bottom flask with condenser, nitrogen adaptor, mechanical stirrer, and addition funnel, and the reaction was heated to 120° C. under nitrogen blanket with agitation. Charge B and charge C were then added over two hours at reflux. Charge D was used to rinse Charge C. After addition of charge D, the reaction was held at reflux for two hours. Charge E was then added over 30 minutes at 85° C. The reaction mixture was heated for an additional 30 minutes at 85° C. The clear yellow solution was poured and percent solids were checked by heating a sample at 110° C. for 1 hour in an oven (63.82% solids). The resulting resin had a Mw of 2393 g/mol. with residual monomers of HEA at 0.02 mol. %, iBMA at 0.71 mol. %, DMAEMA at 0.17 mol. %.

Example 2

The components of Table 2 were used to prepare a polyester functional polymer.

TABLE 2

| Component | Wt. in grams |
|---|---|
| Resin of Example 1 | 234.48 |
| ε-Caprolactone | 59.13 |
| Tin (II) ethylhexanoate | 0.54 |
| DOWANOL ™ PMA[3] | 55.38 |

[3]Propylene glycol methyl ether acetate (CAS# 108-65-6), available from Dow Chemical Company.

All components were charged into a 4-neck round bottom flask equipped with condenser, nitrogen adaptor, and mechanical stirrer. The reaction mixture was heated to 130° C. under nitrogen blanket with agitation for 5 hours at which time the percent solids was expected to be over 60%. The light yellow solution was then poured and the final percent solids were checked by heating a sample at 110° C. for 1 hour in an oven (60.37% solids). The resulting product had a Mw of 8761 g/mol. and 0.13 mol. % ε-caprolactone residual monomer.

Example 3

The components of Table 3 were used to prepare another polyester functional polymer.

TABLE 3

| Component | Wt. in grams |
|---|---|
| Resin of Example 1 | 156.41 |
| ε-Caprolactone | 118.48 |
| Tin (II) ethylhexanoate | 0.36 |
| DOWANOL ™ PMA[3] | 89.42 |

[3]Propylene glycol methyl ether acetate (CAS# 108-65-6), available from Dow Chemical Company.

All components were charged into a 4-neck round bottom flask equipped with condenser, nitrogen adaptor, and mechanical stirrer. The reaction mixture was heated to 130° C. under nitrogen blanket with agitation for 10 hours at which time the percent solids was expected to be over 60%. The light yellow solution was poured and the final percent solids were checked by heating a sample at 110° C. for 1 hour in an oven (60.88% solids). The resulting product had a Mw of 12,870 g/mol. with 0.49 mol. % ε-caprolactone residual monomer.

Examples 4-7: Liquid Pigment Dispersions

Liquid pigment dispersions were prepared from the components listed in Table 4.

TABLE 4

| Component | Comparative Example 4 | Example 5 | Example 6 | Example 7 |
|---|---|---|---|---|
| | Amount in grams | | | |
| Acrylic grind resin[4] | 39.46 | — | — | — |
| Acrylic Resin of Example 1 | — | 48.68 | — | — |
| Polyester Resin of Example 2 | — | — | 51.35 | — |
| Polyester Resin of Example 3 | — | — | — | 51.35 |
| Methyl n-amyl ketone | 10.71 | 4.96 | 3.96 | 3.96 |
| n-Butyl acetate | 5.64 | 2.61 | 2.08 | 2.08 |
| DISPERBYK ® 167[5] | 9.70 | 9.6 | 9.35 | 9.35 |
| BYK-SYNERGIST ™ 2105[6] | 0.68 | 0.67 | 0.65 | 0.65 |
| CINILEX ® DPP Red SR1C[7] | 33.82 | 33.48 | 32.61 | 32.61 |

[4]A solution of an acrylic grind resin comprising styrene, isobutyl methacrylate, 2-ethyl-hexylacrylate, hydroxyethyl methacrylate, methacrylic acid, 1-(3-isopropenyl-phenyl)-1-methyl-ethylamine, and a polyester plasticizer, dissolved in methyl n-amyl ketone
[5]Wetting and dispersing additive commercially available from BYK Chemie
[6]Pigment synergist commercially available from BYK Chemie
[7]Diketo-pyrrolo-pyrrole based pigment red 254 available from Cinic Chemicals America, LLC All components for each of Examples 4-7 were combined in an appropriate sized container. The Cinilex DPP Red SR1C was dispersed under high shear force using 1.5 mm Zircoa beads in glass jars on a Lau Disperser 200 until a particle size of less than 10 μm was obtained, determined by a Hegman "Fineness of Grind Gauge" in accordance with ASTM D1210. The thus obtained liquid pigment dispersions of Comparative Example 4 and Examples 5-7 were evaluated as reported in Table 5, where percent volume is calculated as percent of component volume of total component volume and pigment to binder ratio is calculated as the weight ratio of the total of all pigments to the binder (resin).

TABLE 5

Properties of Liquid Pigment Dispersions

| | % Non-Volatile Matter (Volume)[8] | % Pigment Volume Concentration (PVC)[9] | % Polymer (Volume) | Pigment/Polymer Ratio (P/B) |
|---|---|---|---|---|
| Comparative Example 4 | 62.56 | 38.32 | 38.59 | 0.9 |
| Example 5 | 62.5 | 38.25 | 38.59 | 0.9 |
| Example 6 | 62.5 | 37.24 | 39.22 | 0.9 |
| Example 7 | 62.5 | 37.24 | 39.22 | 0.9 |

[8]Volume of non-volatile matter in clear or pigmented coatings measured in accordance with ASTM D2697.
[9]Volume of non-volatile pigment in pigmented coatings measured in accordance with ASTM D6093.

As demonstrated in Table 5, the liquid pigment dispersions of Examples 5-7 that were prepared using the hindered amine light stabilizer (HALS) functional grind resins of the present invention as polymeric dispersant achieved similar percent non-volatile matter (volume), pigment volume concentration (PVC), percent resin volume, and pigment to binder ratio (P/B) as the conventional pigment grind resin of Comparative Example 4.

Comparative Example 8: Coating Composition with Direct Milled Pigment and Coating Derived Therefrom The components of Table 6 were used to produce a liquid coating composition by a direct milling technique, according to which the pigment was dispersed directly into the coating composition under high shear conditions. All components of Stage 1 were combined in an appropriate sized container. The Cinilex DPP Red SR1C was dispersed under high shear force on a Lau Disperser 200 until a particle size of less than 10 μm was obtained, determined by a Hegman "Fineness of Grind Gauge" in accordance with ASTM D1210. Then the components of Stage 2 were added and thoroughly mixed by shaking. In Stage 3, the polyisocyanate, was added just prior to spray application. The resulting coating composition was spray applied at ambient temperature and humidity conditions approximately 23° C. and 35% relative humidity using a Sata HVLP gun with a 1.4 nm tip onto electrocoated panels and cured at 180° F. for 30 minutes. The cured coating was aged for 7 days prior to evaluation of physical and performance properties.

TABLE 6

| Component (grams) | Comparative Example 8 |
|---|---|
| Stage 1 | |
| Polyester polyol[10] | 33.75 |
| n-Butyl acetate | 2.61 |
| Methyl n-amyl ketone | 2.35 |
| Ethyl 3-ethoxypropionate | 1.82 |
| Eastman C-11 ketone[11] | 0.81 |
| CINILEX ® DPP Red SR1C[7] | 11.452 |
| BYK-SYNERGIST ™ 2105[6] | 0.23 |
| DISPERBYK-167[5] | 3.28 |
| TINUVIN ® 292[12] | 1.15 |
| TINUVIN ® 328[13] | 0.57 |
| BYK ®-430[14] | 0.57 |
| DISPERLON ® NS-5500[15] | 2.87 |
| Stage 2 | |
| Acetone | 3.46 |
| Dibutyltin dilaurate | 0.03 |
| 2,4-Pentanedione | 1.15 |
| 2-Ethylhexanoic acid | 0.57 |
| Acrylic microgel[16] | 1.22 |
| VERSAFLOW ™ Base[17] | 0.24 |
| RESIFLOW ® LH-240[18] | 0.18 |
| BYK ™-3455[19] | 0.12 |
| BYK ™-320[20] | 0.06 |
| Stage 3 | |
| Polyisocyanate[21] | 31.51 |

[10]Polyester polyol prepared according to U.S. Pat. Pub. No. 9,359,524, Example 1
[11]Mixture of ketone solvents, commercially available from Eastman Chemical Co.
[12]Light stabilizer, commercially available from Ciba Specialty Chemicals.
[13]Light stabilizer, commercially available from Ciba Specialty Chemicals.
[14]Liquid rheology additive commercially available from BYK Chemie.
[15]Liquid thixotrope commercially available from King Industries.
[16]Acrylic microgel produced by PPG industries.
[17]Liquid polyolefin flow additive, commercially available from Shamrock Technologies.
[18]Liquid flow additive, commercially available from Estron Chemical.
[19]Liquid flow additive, commercially available from BYK Chemie.
[20]Liquid flow additive, commercially available from BYK Chemie.
[21]Polyfunctional aliphatic isocyanate resin comprising 80% by wt. DESMODUR ® N3300A (Covestro, Inc.) in a mixture of n-butylacetate and Solvesso 100

Examples 9-12

Coatings Compositions with Pigment Dispersion and Coatings Derived Therefrom Liquid coating compositions were prepared using the pigment dispersions of Comparative Example 4 and Examples 5-7 as listed in Table 7. All components of Stage 1 were combined in an appropriately sized container and agitated under low shear Cowles blade by air motor with stir blade until thoroughly mixed. In Stage 2, the polyisocyanate was added just prior to spray application. The coatings were spray applied at ambient temperature and humidity conditions using a Sata HVLP gun with a 1.4 nm tip onto electrocoated panels and cured at 180° F. for 30 min. The cured coatings were aged for 7 days prior to evaluation of physical and performance properties.

TABLE 7

| Component (grams) | Comparative Example 9 | Example 10 | Example 11 | Example 12 |
|---|---|---|---|---|
| Stage 1 | | | | |
| Polyester polyol[10] | 28.39 | 28.31 | 28.09 | 28.09 |
| n-Butyl acetate | 2.19 | 2.19 | 2.17 | 2.17 |
| Methyl n-amyl ketone | 1.98 | 1.97 | 1.96 | 1.96 |
| Ethyl 3-ethoxypropionate | 1.53 | 1.53 | 1.52 | 1.52 |
| Eastman C-11 Ketone[11] | 0.68 | 0.68 | 0.67 | 0.67 |
| TINUVIN ® 292[12] | 0.96 | 0.96 | 0.95 | 0.95 |
| TINUVIN ® 328[13] | 0.48 | 0.48 | 0.48 | 0.48 |
| BYK-430[14] | 0.48 | 0.48 | 0.48 | 0.48 |
| DISPERLON NS-5500[15] | 2.41 | 2.40 | 2.39 | 2.39 |
| Acetone | 2.91 | 2.90 | 2.88 | 2.88 |
| Dibutyltin dilaurate | 0.02 | 0.02 | 0.02 | 0.02 |
| 2,4-Pentanedione | 0.96 | 0.96 | 0.95 | 0.95 |
| 2-ethylhexanoic acid | 0.48 | 0.48 | 0.48 | 0.48 |
| Acrylic microgel[16] | 1.03 | 1.02 | 1.01 | 1.01 |
| VERSAFLOW ™ Base[17] | 0.2 | 0.2 | 0.20 | 0.20 |
| RESIFLOW ® LH-240[18] | 0.15 | 0.15 | 0.15 | 0.15 |
| BYK-3455[19] | 0.10 | 0.10 | 0.10 | 0.10 |
| BYK-320[20] | 0.05 | 0.05 | 0.05 | 0.05 |
| Pigment dispersion of Comparative Example 4 | 28.47 | — | — | — |
| Pigment dispersion of Example 5 | — | 28.67 | — | — |
| Pigment dispersion of Example 6 | — | — | 29.22 | — |
| Pigment dispersion of Example 7 | — | — | — | 29.22 |
| Stage 2 | | | | |
| Polyisocyanate[21] | 26.51 | 26.43 | 26.23 | 26.23 |

The cured coatings of Comparative Example 8 (direct milled pigment), Comparative Example 9 (conventional acrylic grind resin), and Examples 10-12 (with pigment dispersion according to the present invention) were tested for gloss, gloss retention, and color stability with the results reported in Table 8.

TABLE 8

| Cured Coating | 20° Gloss[22] | % 20° Gloss Retention after 2500 hrs[23] | ΔE after 2500 hrs[24] | % 20° Gloss Retention after 5000 hrs[23] | ΔE after 5000 hrs[24] |
|---|---|---|---|---|---|
| Comparative Example 8 (direct mill) | 87.4 | 88.9 | 0.93 | 38.6 | 1.52 |
| Comparative Example 9 (conventional grind resin) | 87.3 | 46.4 | 0.40 | 4.9 | 0.35 |
| Example 10 | 84 | 83.0 | 0.82 | 56.2 | 0.72 |
| Example 11 | 86.4 | 76.2 | 0.69 | 45.8 | 0.95 |
| Example 12 | 87.1 | 74.3 | 0.64 | 29.4 | 0.37 |

[22]Specular gloss measured in accordance with ASTM D523.
[23]Gloss retention of a coating after exposure to accelerated weathering conditions measured in accordance with SAE J2527.
[24]Color change of a coating after exposure to accelerated weathering conditions measured in accordance with SAE J2527.

The cured coatings of Examples 10-12 incorporating the hindered amine light stabilizer (HALS) functional polymeric dispersant of the present invention exhibited acceptable gloss, gloss retention, and color stability. In particular, the cured coatings of Examples 10-12 exhibited improved gloss retention after 2500 hours and 5000 hours of accelerated weathering test compared to the coating of Comparative Example 9 including a conventional pigment grind resin and improved color retention (ΔE) compared to the coating of Comparative Example 8 produced via a direct milling process.

Example 13

An aqueous acid-functional resin composition for use as a polymeric dispersant for pigments was prepared from the following components listed in Table 9.

TABLE 9

| Component | Wt. in grams |
|---|---|
| A | |
| Butyl carbitol | 560.26 |
| Deionized (DI) water | 44.16 |
| B | |
| Butyl carbitol | 18.05 |
| Styrene (STY) | 508.12 |
| Butyl acrylate (BA) | 592.66 |
| Butyl methacrylate (BMA) | 304.5 |
| Acrylic acid (AA) | 144.76 |
| Hydroxyethyl acrylate (HEA) | 150.9 |
| N-methyl HALS methacrylate[25] | 380.12 |
| C | |
| Butyl carbitol | 294.6 |
| VAZO ™ 67[2] | 14.55 |
| D | |
| Butyl carbitol | 74.15 |
| E | |
| Dimethylethanolamine (DMEA) | 96.33 |
| DI water | 116.62 |
| F | |
| DI water | 8004 |

[25]2,2,6,6-tetramethyl-4-piperidyl methacrylate (CAS#31582-45-3)

Charge A was placed into a 4-neck round bottom flask equipped with condenser, nitrogen adaptor, mechanical stirrer, and addition funnel and the reaction mixture was heated to 116° C. under nitrogen blanket with agitation. Charge B and charge C were then added over three hours at reflux. Charge D was used to rinse Charge C. After addition of charge D, the reaction was held at reflux for one hour. Charge E was then added over 10 minutes at 105° C. The reaction mixture was heated for an additional 15 minutes. The reaction mixture was then cooled to 50° C. The cloudy dispersion was poured and percent solids was checked by heating a sample at 110° C. for 1 hour in an oven (18.59% solids). The resulting resin had a Mw of 20,315 g/mol. with residual monomers of HEA of less than 0.01 mol. %, BMA at 0.12 mol. %, BA at 0.62 mol. %, and STY at 0.10 mol. %.

The present invention is also directed to the following clauses.

Clause 1: A pigment dispersion comprising (a) at least one pigment and (b) a polymeric dispersant comprising residual units derived from polymerization of a mixture of monomers comprising (b1) at least one ethylenically unsaturated hindered amine light stabilizing monomer and (b2) at least one ethylenically unsaturated monomer different from monomer (b1).

Clause 2: The dispersion of clause 1, wherein the at least one additional ethylenically unsaturated monomer (b2) comprises an ethylenically unsaturated monomer having affinity for the pigment.

Clause 3: The dispersion of clause 2, wherein the ethylenically unsaturated monomer having affinity for the pigment comprises at least one functional group with affinity for the pigment selected from an amine group, an ammonium group, an aromatic group, a phenolic group, a carboxylic acid group, a sulfonate group, a phosphonate group, a nitro group, a hydroxyl group or a combination thereof.

Clause 4: The dispersion of clause 3, wherein the at least one pigment comprises an organic pigment and the pigment affinic monomer comprises at least one functional group with affinity for the organic pigment selected from an amine group, an ammonium group, an aromatic group (such as a phenolic group), or a combination thereof.

Clause 5: The dispersion of clause 3, wherein the at least one pigment comprises an inorganic pigment and the pigment affinic monomer comprises at least one functional group with affinity for the inorganic pigment selected from a carboxylic acid group, a sulfonate group, a phosphonate group, an ammonium group, a nitro group, a hydroxyl group or a combination thereof.

Clause 6: The dispersion of any one of the preceding clauses 2 to 5, wherein the at least one additional ethylenically unsaturated monomer (b2) comprises in addition to the ethylenically unsaturated monomer having affinity for the pigment at least one further ethylenically unsaturated monomer.

Clause 7: The dispersion of any one of the preceding clauses 1 to 6, wherein the at least one additional ethylenically unsaturated monomer (b2) comprises a hydroxy functional ethylenically unsaturated monomer such as a hydroxyalkyl (meth)acrylate, for example as an ethylenically unsaturated monomer having affinity for the pigment or as another ethylenically unsaturated monomer different from monomer (b1).

Clause 8: The dispersion of any one of the preceding clauses 1 to 7, wherein the ethylenically unsaturated hindered amine light stabilizing monomer (b1) comprises piperidyl (meth)acrylate or a derivative thereof.

Clause 9: The dispersion of any one of the preceding clauses 1 to 8, wherein the polymeric dispersant further comprises at least one linkage in the polymer selected from an ester linkage, an ether linkage or a combination thereof.

Clause 10: The dispersion of clause 9, wherein the ester linkage(s) comprise(s) a residue of a caprolactone, lactide, valerolactone or a combination thereof.

Clause 11: The dispersion of clause 9 or 10, wherein the ether linkage(s) comprise(s) a residue of ethylene oxide, propylene oxide, tetrahydrofuran or a combination thereof.

Clause 12: A curable coating composition comprising the pigment dispersion of any one of the preceding clauses 1-11 and a resinous binder.

Clause 13: The curable coating composition of clause 12, wherein the resinous binder comprises at least one functional group selected from an ether group, ester group, hydroxyl group, acid group, amine group, amide group, carbamate group, urea group, aromatic functional group or a combination thereof.

Clause 14: The curable coating composition of any one of the preceding clauses 12 or 13, further comprising a crosslinker reactive with the resinous binder and/or the polymeric dispersant.

Clause 15: The curable coating composition of any one of the preceding clauses 12-14, further comprising a solvent.

Clause 16: The curable coating composition of clause 15, wherein (a) the solvent comprises an organic solvent and the at least one pigment comprises an organic pigment or (b) the medium comprises an aqueous solvent and the at least one pigment comprises an inorganic pigment.

Clause 17: The curable coating composition of any one of the preceding clauses 12-16, wherein the coating composition is a powder coating composition or is a liquid coating composition.

Clause 18: A method for coating a substrate comprising: applying a curable coating composition according to any one of the preceding clauses 12 to 17 onto at least a portion of a substrate; and curing the coating composition to form a coating on the substrate.

Clause 19: A substrate at least partially coated with a curable coating composition according to any one of the preceding claims 12 to 17 or coated with a coating prepared according to the method of clause 18.

Clause 20: The coated substrate according to clause 19, wherein the cured coating has an ultraviolet durability at least as high as a coating prepared from a corresponding coating composition, but without the polymeric pigment dispersant.

Whereas particular embodiments of this invention have been described above for purposes of illustration, it will be evident to those skilled in the art that numerous variations of the details of the present invention may be made without departing from the invention as defined in the appended claims.

The invention claimed is:

1. A pigment dispersion comprising (a) at least one pigment and (b) a polymeric dispersant comprising residual units derived from polymerization of a mixture of monomers comprising (b1) at least one ethylenically unsaturated hindered amine light stabilizing monomer and (b2) at least one additional ethylenically unsaturated monomer different from monomer (b1),
wherein the polymeric dispersant further comprises at least one linkage in the polymer selected from an ester linkage, an ether linkage or a combination thereof.

2. The dispersion of claim 1, wherein the at least one additional ethylenically unsaturated monomer (b2) comprises an ethylenically unsaturated monomer having affinity for the pigment.

3. The dispersion of claim 2, wherein the ethylenically unsaturated monomer having affinity for the pigment comprises at least one functional group with affinity for the pigment selected from an amine group, an ammonium group, an aromatic group, a phenolic group, a carboxylic acid group and/or a salt thereof, a sulfonate group, a phosphonate group, a nitro group, a hydroxyl group or a combination thereof.

4. The dispersion of claim 3, wherein the at least one pigment comprises an organic pigment and the pigment affinic monomer comprises at least one functional group with affinity for the organic pigment selected from an amine group, an ammonium group, an aromatic group, or a combination thereof.

5. The dispersion of claim 3, wherein the at least one pigment comprises an inorganic pigment and the pigment affinic monomer comprises at least one functional group with affinity for the inorganic pigment selected from a carboxylic acid group and/or a salt thereof, a sulfonate group, a phosphonate group, an ammonium group, a nitro group, a hydroxyl group or a combination thereof.

6. The dispersion of claim 2, wherein the at least one additional ethylenically unsaturated monomer (b2) comprises in addition to the ethylenically unsaturated monomer having affinity for the pigment at least one further ethylenically unsaturated monomer.

7. The dispersion of claim 1, wherein the at least one additional ethylenically unsaturated monomer (b2) comprises a hydroxy functional ethylenically unsaturated monomer.

8. The dispersion of claim 1, wherein the ethylenically unsaturated hindered amine light stabilizing monomer (b1) comprises piperidyl (meth)acrylate or a derivative thereof.

9. The dispersion of claim 1, wherein the ester linkage(s) comprise(s) a residue of a caprolactone, lactide, valerolactone or a combination thereof.

10. The dispersion of claim 1, wherein the ether linkage(s) comprise(s) a residue of ethylene oxide, propylene oxide, tetrahydrofuran or a combination thereof.

11. A curable coating composition comprising the pigment dispersion of claim 1 and a resinous binder.

12. The curable coating composition of claim 11, wherein the resinous binder comprises at least one functional group selected from an ether group, ester group, hydroxyl group, acid group, amine group, amide group, carbamate group, urea group, aromatic functional group or a combination thereof.

13. The curable coating composition of claim 11, further comprising a crosslinker reactive with the resinous binder and/or the polymeric dispersant.

14. The curable coating composition of claim 11, further comprising a solvent.

15. The curable coating composition of claim 14, wherein the solvent comprises an organic solvent and the at least one pigment comprises an organic pigment, or wherein the solvent comprises an aqueous medium and the at least one pigment comprises an inorganic pigment.

16. The curable coating composition of claim 11, wherein when the coating composition is applied to a substrate and cured, the cured coating has an ultraviolet durability greater than or equal to a coating prepared from the same resinous binder and pigment but without the polymeric pigment dispersant.

17. A substrate at least partially coated with a coating deposited from the curable coating composition of claim 11.

18. A method for coating a substrate comprising:
applying a curable coating composition according to claim 11 onto at least a portion of the substrate; and
curing the coating composition to form a coating on the substrate.

19. A substrate at least partially coated with a coating prepared according to the method of claim 18.

* * * * *